United States Patent [19]

Destree

[11] 4,234,155
[45] Nov. 18, 1980

[54] TOOL STAND

[76] Inventor: Allen L. Destree, 13645 Mukilteo Speedway, Lynnwood, Wash. 98036

[21] Appl. No.: 952,916

[22] Filed: Oct. 19, 1978

[51] Int. Cl.² ............................................. F16F 15/00
[52] U.S. Cl. .................................. 248/651; 173/43; 248/124
[58] Field of Search ............... 248/654, 651, 652, 657, 248/662, 660, 124; 173/43, 38, 28, 45, 44; 403/364; 211/182

[56] References Cited

U.S. PATENT DOCUMENTS

| | | | |
|---|---|---|---|
| 355,347 | 1/1887 | Sergeant | 248/651 X |
| 396,866 | 1/1889 | Foster | 248/651 X |
| 792,288 | 6/1905 | Prellwitz | 248/660 |
| 990,425 | 4/1911 | Condict | 173/43 X |
| 1,113,531 | 10/1914 | Ball | 173/43 X |
| 2,389,553 | 11/1945 | Sellars | 248/662 |
| 2,434,827 | 1/1948 | Akers | 248/662 X |
| 2,575,097 | 11/1951 | Cole | 248/651 |
| 3,148,001 | 9/1964 | Johnson | 173/43 X |
| 3,464,655 | 9/1969 | Schuman | 248/651 |
| 3,912,410 | 10/1975 | Pofferi | 211/182 X |

FOREIGN PATENT DOCUMENTS 2220975  10/1974  France ...................................... 403/364

*Primary Examiner*—J. Franklin Foss
*Attorney, Agent, or Firm*—David L. Garrison

[57] ABSTRACT

A tool stand for orienting and holding a tool such as a core drilling apparatus for sampling concrete or earth formations, comprising a base, an elongated column projecting from said base, a carriage means supported by enclosing the column, the carriage means being adjustable to fit closely about the column and having a rack on said column with interengaging pinion means in the carriage for translation of the carriage along the column. The carriage is adapted to receive a pneumatic drilling device or additional columns, the additional columns being positioned at right angles to the first column. Columns are equipped with interfitting end hardware so that a plurality of columns may be joined endwise.

11 Claims, 8 Drawing Figures

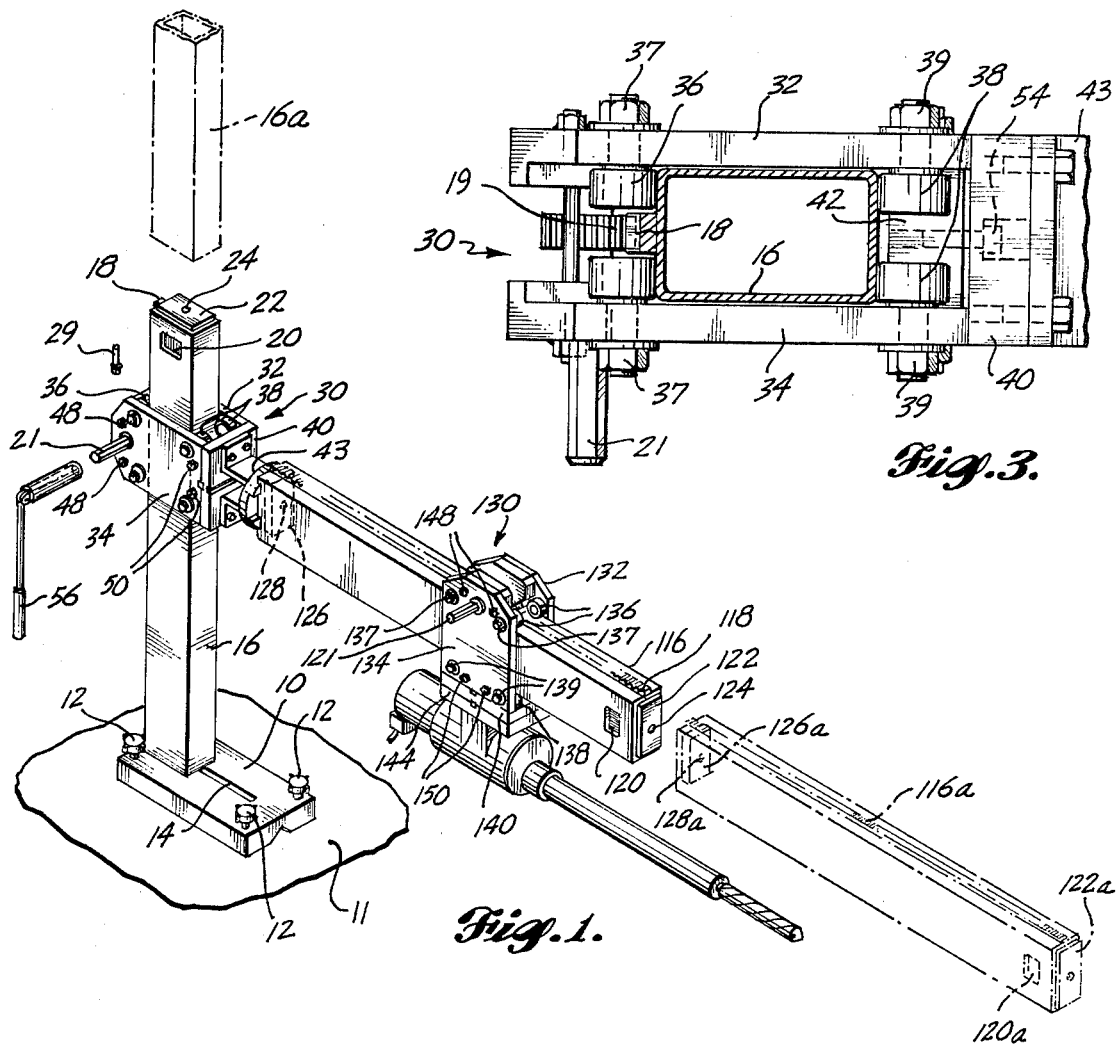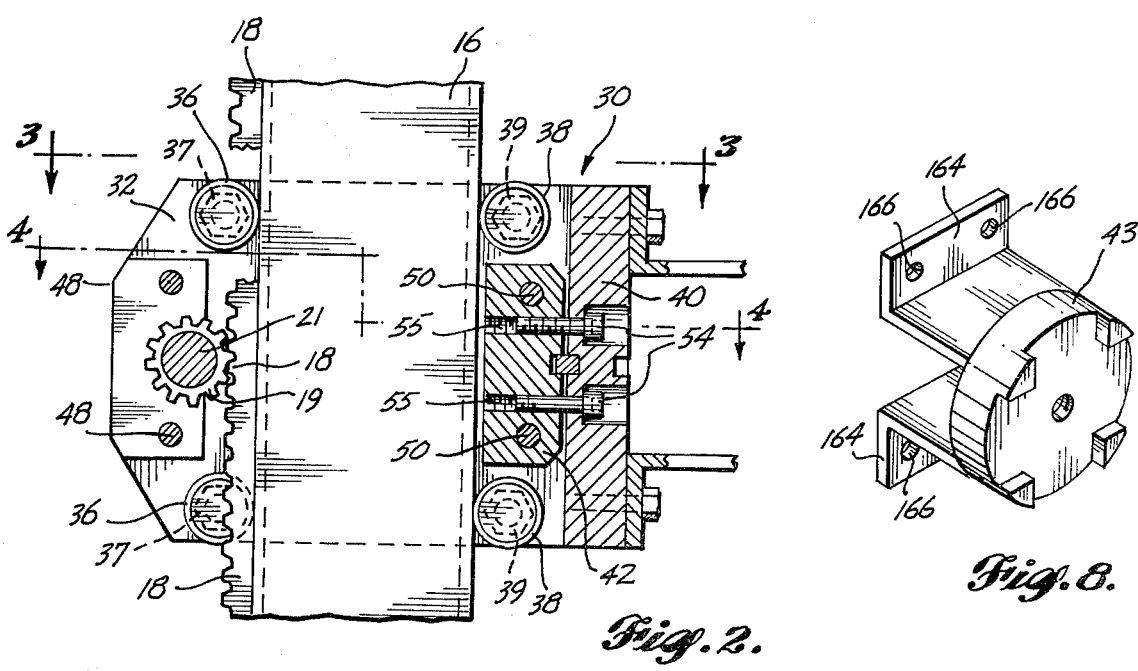

TOOL STAND

TECHNICAL FIELD

Core drilling and cutting of rock formations and of concrete require that the drill be held in a rigid and steady fashion. This invention relates to core drilling and cutting of concrete and rock formulations with rotational devices and more particularly to a stand for holding mechanical operated devices such as a core drill which stand is light, portable, yet provides a rigid but manipulatable stand for supporting the tool while the drill or saw moves into the concrete or rock.

BACKGROUND ART

The drilling of holes in concrete, as on construction sites, requires relative large and heavy drills which are difficult to manipulate manually. Holes formed by the use of manually guided drills usually are not round and straight. Frequently drill bits are broken because their drive motors are not steady during the drilling operation.

To eliminate the above-mentioned undesirable effects and conditions, supporting structures have been devised to hold and guide the drill motor during the drilling process. These structures generally provide a base for mounting the drill, together with the motor powering the drill bit itself, to the surface in which a hole is to be drilled. Conventionally, a post is mounted on the base, the drill being guided toward and away from the surface along the post. The end of the post spaced from the base is steadied by a variety of devices, such as tie bars and support plates which are connected bewteen the base and the post. A carriage is slidably secured to the post for mounting the drill, and it is known to drive the carriage mechanically along the post as by a rack and pinion mechanism.

In prior devices put into practice, the drill guide carriages are removable from the post only by removing the tie bars or support plates, e.g., from the end of the post farthest from the base, and by slipping the carriage over that end of the post. Because the carriage support structure had to be at least partially dismantled, removal of the drill-mounting carriage in prior coring and drill devices was cumbersome and time-consuming.

An adequately strong and rigid drill support base of the type of interest is a heavy structure in itself. Substantial weight is added to the support base by the carriage and the drill. The heavier the complete device, the more difficult it is to handle. When a hole is to be drilled, on a vertical surface such as a wall, on an overhead surface such as a ceiling or in inaccessible places, the carriage and the drill usually have to be removed from the base to enable an operator to attach the base to such surface. After the base has been attached to the desired surface, the carriage, together with the drill mounted to it, must be slipped over the post of the prior art device. The tie bar must then be secured to the post before the drilling operation can commence.

Particularly where a prior device is to be used high on a wall, the person attaching the carriage to the post has to reach back away from the wall (and away from a ladder or scaffold upon which the person may be standing) and guide the carriage and the drill motor onto the post. This procedure requires considerable physical effort and results in frequent accidents. These problems are especially acute where limited space is available and the operator has to work overhead.

Moreover, in practice, the carriages are frequently exchanged one for another in the substitution of one drill for another because each carriage is designed to mount a particular drill. Each time such a change is necessary, the apparatus must be dismantled and removed from the guide posts of prior devices, the carriage removed axially from the post, and a new one inserted.

The requirements of rigidity and non-yielding support for core drills has, in the past, resulted in the usage of large cumbersome devices for holding core drills. For example, in U.S. Pat. Nos. 2,575,092 (Cole); 2,849,212 (Robbins); and 3,148,001 (Johnson) extensive anchoring to floor and ceiling or complicated linkage mechanism are used to position, orient and impart drilling motion to the core drill or concrete saw apparatus. Similarly, in lighter less cumbersome devices, precision in locating the drill or saw is lacking since wear plates are necessary in the interfitting parts of the mechanism. Frequent maintenance is necessary particularly in the dust filled and gritty atmosphere in which such tools are used. The wear plates accumulate the abrasive dust and grind it into the mechanism. Examples of such devices are shown in U.S. Pat. No. 3,464,655 issued to A. Schuman.

These and other devices known to the prior art have a set overall size which is not readily dismantled for movement from job to job nor do they have the capability of readily positioning the core drill or saw in virtually any angular orientation.

OBJECTS OF THE INVENTION

It is an object of this invention to provide a tool stand which maintains the tool at a particular angular orientation in a secure and rigid fashion.

It is another object of this invention to provide a tool stand made up of a plurality of column elements, two of which may be joined in end to end fashion by a single fastener and which may be attached to a bore or to a carriage means positioned on a second column again by usage of a single fastener, the tool being positioned on a carriage movable lengthwise along one of said column elements.

It is another object of this invention to provide a tool stand with a tool carriage movable lengthwise of support columns, said carriage being adjustable about the support columns for translation thereupon without the need for wear plates.

A further object of this invention is to provide a rigid tool stand constructed of a plurality of column elements wherein the column elements are interchangeable and may be positioned at varying angular orientations.

These and other objects and attributes of this invention will become apparent to one of skill in the art by examination of the appended drawings and review of the following description.

DISCLOSURE OF INVENTION

The core drill stand described herein is constructed of three basic elements; namely, a base frame means, one or more columns extending outwardly from said base frame means, and one or more carriage means adapted to closely encircle and translate along said columns. A plurality of column segments may be used by extending the column segments in end-to- end relationship utilizing the unique end interengagement provided by a protruding block means positioned at one end of each column segment and a recessed block means positioned at the opposite end of each column segment. Interengagement of the column segments is achieved by insertion of projecting block of a first column into the recess formed by the periphery of the end of a second column and the recessed block positioned therein utilizing a bolt inserted through a bolt hole in the protruding block into a threaded hole in the recess block. The bolt draws the two end portions of the columns together with the protruding block nestled within the adjacent column keying the columns together to prevent relative rotation. Perimeter contact between adjacent columns results. A toothed rack is positioned on the outer surface of the rectangular columns and is engaged by a rotatable pinion carried by the carriage. Rotation of the pinion urges the carriage along the column and provides the necessary motion for the core drilling apparatus or other tool carried by the carriage.

In one embodiment the carriage operating on the column segment attached to the base is provided with an adapter means for mounting a second column segment in an orientation preferably perpendicular to the column segment attached to the base. The second column is constructed and arranged identically with the first column and, in turn, carries a carriage means snugly fitting about the periphery of the second rectangular column. The second carriage means also contains a rotatable pinion engaging the rack positioned on the exterior of the second column so that the second carriage may traverse along the column. Rotation of the pinion causes a movement of the carriage, thereby imparting motion to the tool carried by the carriage. In a fashion similar to the first column, additional column segments may be attached to the second column to provide the desired length of tool support.

The carriages noted above are comprised of a pair of opposed side plates which each carry cam follower type rollers each adapted for rotation about an axis which is perpendicular to the inner surface of the opposed side plates and which engage opposing surfaces of the column. The side plates are generally positioned adjacent each major surface of the rectangular column and are adjustable held in close proximity to the columns by a mechanism which will be described below. The rack on one side of the rectangular column is positioned between the rollers which traverse the surface carrying the rack. Rollers engaging the surface of the column opposite the rack are adjustable so that the distance between opposed rollers may be varied thereby accommodating minor variations in the size of columns used.

In order to avoid the need of wear strips, as is commonly used in prior art core drilling stands, the distance between the opposed first and second side plates is adjustable to close tolerances with the exterior of the rectangular column by means of a pair of bolts extending through the side plates and holes in a lock block positioned between the side plates. The side plates may be drawn into new engagement with the sides of the column. When the desired clearance is obtained, such as by use of a feeler guage or removable shim, the locking block is drawn toward an end plate by means of one or more cap screws so that the end plate engages the end edges of the first and second side plates in a secure substantially perpendicular clamped structure thus locking the structure with the close tolerance to the column. Locking bolts extending through the structure on the other side of the column from the width adjusting mechanism may be tightened to clamp the carriage structure about the column whenever it is desirred to prevent motion of the carriage with respect to the column.

Any sort of drilling or cutting apparatus commonly used in the core drilling or sampling of concrete, geological formations, or the like may then be attached to the second carriage means and be caused to travel along the second column to perform the core drilling cutting or other operation desired.

BRIEF DESCRIPTION OF THE DRAWINGS

FIG. 1 is a perspective view of the device of this invention.

FIG. 2 is a side elevational view partly broken away of the vertical carriage.

FIG. 3 is a cross-sectional view of the apparatus of FIG. 2 taken along lines 3—3 of FIG. 2.

FIG. 8 is a perspective view of an adapter means used in this invention.

BEST MODE OF CARRYING OUT THE INVENTION

Figure 4:
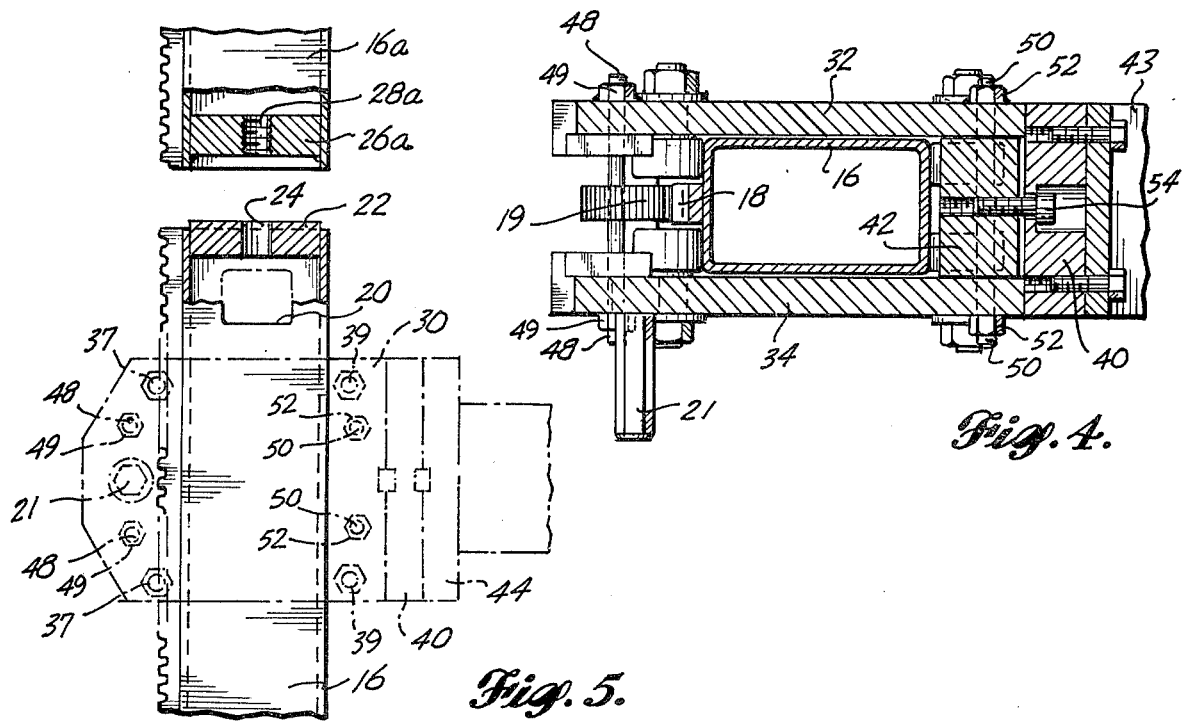
FIG. 4 is a cross-sectional view of the apparatus shown in FIG. 2 taken along lines 4—4 of FIG. 2.
Figure 5:
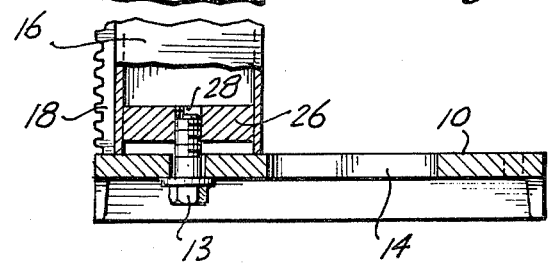
FIG. 5 is a side elevational view of the apparatus of this invention showing the segmented column construction.

Referring specifically to the drawings, wherein like numerals indicate like parts, a first embodiment of the invention is shown in FIGS. 1-5 in which a vertical column 16 is securely attached to a base 10 by means of a single removable bolt 13. Leveling bolts 12 are provided at each corner of the tool stand bore 10 to facilitate adjustable mounting of the bore 10 to floor 11. A slot 14 permits translation of the end of column 16 across the top face of bore 10 to any desired location, bolt 13 being inserted through slot 14. Column 16 comprises an elongated rectangular rigid steel tube of nominal dimensions of 2 ¼ inches by 4 inches (3.65 cm by 10.16 cm). The columns may be of any desired length but are preferably of approximately two feet (60 cm) to four feet (120 cm) in length. Each column has at one end a protruding block 22 and 22a welded into the columns at one end thereof and a recessed block 26 and 26a best seen in FIG. 5. The protruding block 22 has a hole in the center thereof large enough to receive a bolt 29 (not shown in FIG. 5). The recessed block 26 and 26a similarly contain an axially directed aperture, however, it is of a smaller diameter than the hole in protruding block 22 and is internally threaded to receive bolt 29, or in the case of the attachment of the column to the base, bolt 13. Extending along one of the two narrower sides of the rectangular columns is a rack 18 having gear teeth thereon which are adapted to receive the teeth of a rotatable pinion as described below. Column 16, 116, 16a and 116a are all essentially identical and contain apertures 20 and 120 in the side of the column adjacent the protruding block 22. The apertures 20 and 120 give access to position and tighten the bolts used to attach end adjacent column sections together. The portion of a protruding block 22 extending beyond the end of column 16 fits within the adjacent column 16a into the recess location of recessed block 26 whereby the ends of the adjacent columns come into perimeter contact without contact between recessed block 26a and protruding block 22. A keyed structure preventing relative rotation between column 16a and 16 thus results with secure engagement of the axially adjacent columns.

A vertically movable carriage means 30 is shown in sliding relationship with column 16. The carriage means 30 comprises first side plate 32 and second side plate 34 positioned in sliding engagement with the larger sides of column 16 and in a substantially parallel relationship to each other. Each side plate 32 and 34 carries two sets of cam roller means 36 and 38 mounted upon axes perpendicular to the plan of each side plate. The cam roller means 36 and 38 are adapted to roll upon the opposed minor surfaces of the rectangular column 16 to support and orient the carriage 30 with respect to the column 16. The first set of cam roller means 36 carried by each plate comprise upper and lower cam rollers 36 securely but rotatively mounted to the first and second side plates 32 and 34 by mounting bolts 37. The second set of cam roller means 38 comprise upper and lower movable cam rollers 38 which are adjustably and rotatively mounted by adjustable mounting bolts 30 to side plates 32 and 34. An eccentric mounting permits adjustment of th distance between the rollers so that the carriage mechanism may be securely mounted upon column 16. Locking bolts 48 which extend through side plates 32 and 34 and spacer block 46 may be utilized to draw down and lock the carriage securely upon column 16 preventing any translation upon column 16.

A lock block 42 occupies the opposite side of the carriage from the spacer block 46 and is used to set and lock the distance between side plates 32 and 34. Lock block 42 has a pair of apertures therethrough to receive width adjusting bolts 50 which extend through each of the side plates 32 and 34 and have nuts 52 at each end thereof drawing down upon nut 52 to cause side plates 32 and 34 to move together. Lock block 42 has a pair of threaded apertures extending perpendicularly to width adjusting bolts 50 to receive cap screws 54. These cap screws 54 extend through front plate 40 and serve to draw front plate 40 and lock block 42 together when tightened. The end edges of side plates 32 and 34 are perpendicular to sides 32 and 34 and abut one face of front plate 40. When cap screws 54 are tightened, they draw lock block 42 toward front plate 40 so that the distance between side plates 32 and 34 is locked by engagement with front plate 40.

In order to receive a second column positioned perpendicularly to the first column 16, an adapter mechanism 44 is shown in FIGS. 1-5 attached to front plate 40 of carriage 30. The adapter is constructed and arranged to receive axially a second column 116 by use of a bolt through adapter 44 extending into the recessed block 126 of column 116. In FIG. 8 a perspective view of the adapter 44 is shown for clarity. Dentations 160 key the column 116 into a set angular relationship with respect to carriage 30 whereby drill 155 can be oriented in the desired direction. One or more additional columns 116a may be added in the manner identical to that described in respect to columns 16 and 16a above.

Column 116 is substantially identical to and interchangeable with column 16 in that rack means 118 extends along the lengths of column 116 and recess block member 126 and protruding block member 122 are constructed and arranged in identical fashion to the corresponding parts of column 16. Aperture 120 permits access to the bolt utilized to attach an additional column 116a if desired.

Carriage 130 is substantially identical to carriage 30, having first side plate 132, second side plate 134, cam rollers 136 mounted upon mounting bolts 137, eccentrically mounted cam rollers 138 mounted upon adjustable mounting bolts 139, a front plate 140 and adapter plate 144, locking bolts 148 and width adjusting bolts 150 all as described with respect to the corresponding parts of carriage 30.

Figure 6:
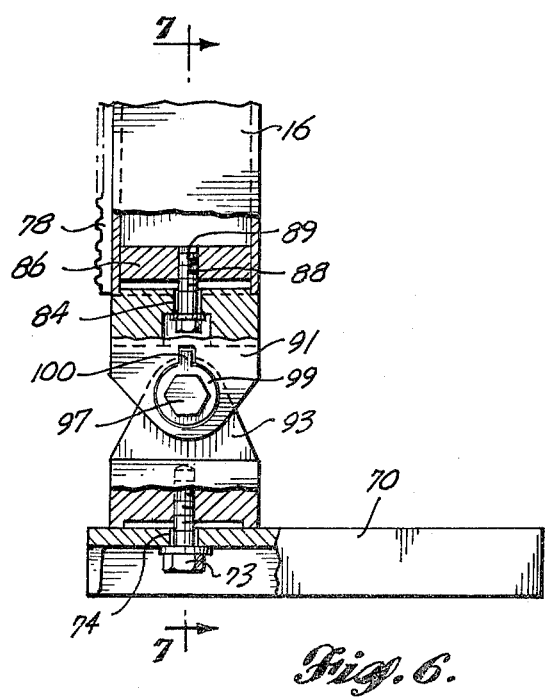
FIG. 6 is a partial side elevational view of one variant form of this invention showing a pivotal base apparatus.
Figure 7:
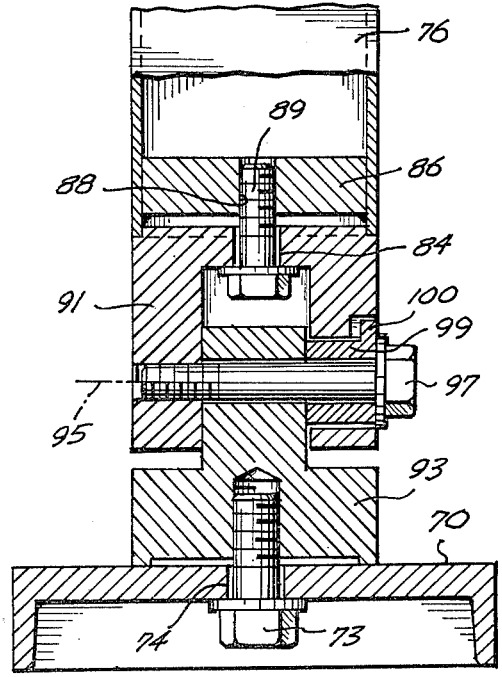
FIG. 7 is a cross-sectional view of the apparatus shown in FIG. 6 taken along lines 7—7 of FIG. 6.

In FIGS. 6 and 7, there is seen an alternate embodiment of the base or secondary column mounting means in which a pivotal engagement permitting drilling at other than right angles with respect to the base 70 can be accomplished. In FIG. 6 the pivotal means shown generally at 68 is mounted upon base frame means 70 by use of mounting bolt 73 threaded into base block 93. A pivot axis 95 is provided by an aperture through base block 93 which is adapted to receive threaded locking pin 97. Pivotal block 91 is supported in engagement with base block 93 by threaded locking pin 97. Locking bushing 99 bears upon one side of base block 93 while pivotal block 91 bears upon the other side when threaded lock pin 97 is tightened. Lock bushing 99 has an upwardly extending key 100 which fits into a recess in pivotal block 91 restraining relative rotation between pivotal block 91 and lock bushing 99. The pivotal block 91 in turn is attached to column 76 by means of a bolt 89 inserted through bolt hole 84 into threaded hole 88 in the recessed block 86. Thus a rigid mounting arrangement is provided having the capability of varying the angular relationship of the column 76 with respect to the base 70.

INDUSTRIAL APPLICABILITY

The apparatus shown in the drawings and described above finds application in the support of rock and concrete drilling and cutting devices such as core drilling apparatus wherein a rigid mounting structure having a capability of holding the drilling or cutting mechanism is a specific angular orientation with respect to the base of the tool stand is necessary while permitting translation of the drill along a set course. The tool stand, as shown in FIGS. 1-5, is assembled on base 10 and attached to the floor of the work area or to a suitable wall, ceiling or other structure by mounting and leveling bolts 12. In the event drilling is to be carried out overhead in a direction parallel to the major axis of column 16, the drill 155 may be attached directly to carriage 30 and cause to traverse along the length of column 16, column 16a and additional columns which may be connected together in an end adjacent fashion. In the event the direction of drilling is to be perpendicular to column 16, the configuration shown in FIG. 1 may be utilized in which column 116 is attached to carriage 30 by use of adapter mechanism 44 with carriage 130 being mounted upon column 116 for axial translation thereupon. Additional column 116a may be connected to column 116 in an end adjacent fashion so that carriage 130 may translate along the length thereof to achieve the drilling function desired.

In assembling the carriage 30 or 130 for movement along columns 16 or 116 respectively, it is necessary to obtain close tolerances between the exterior surface of the column with respect to the two side plates without binding. While the following discussion refers specifically to carriage 30, it will be understood that the analysis of the assembly and adjustment procedures apply as well to the corresponding parts and functions of carriage 130. Referring specifically to FIGS. 1, 3, and 4, the carriage 30 is initially assembled by placing width adjusting bolts 50 through side plates 32 and 34 and lock block 42. Nuts 52 are started on each side. Similarly, the locking bolts 48 are inserted through apertures in side plates 32 and 34 and nuts started thereon. Front plate 40 is loosely attached by cap screws 54 so that the ends of sides plates 32 and 34 abut one surface of front face 40 in a sliding relationship, holding the side plates 32 and 34 parallel. The eccentrically mounted cam rollers are withdrawn to the maximum distance between rollers for insertion of column 16. The carriage means 30 is then placed around column 16 and a removable shim such as a metal feel guage of approximately 0.001 to 0.005 inches (0.002 cm to 0.01 cm) or a sheet of paper is inserted between the side of column 16 and either first side plate 32 or second side plate 34. The nuts on locking bolts 48 and width adjusting bolts 50 are then tightened until side plates 32 or 34 just hold the shim inserted between the respective plate and the side of column 16. Cap screws 54 are then tightened to draw lock block 42 toward front plate 40 whereby the ends of side plates 32 and 34 bear upon the interior surface of front plate 40 thus locking the plates 32 and 34 in a spaced apart parallel relationship, the distance therebetween being the width of the column 16 plus the shim placed between the interior surface of the side plates and the column. The shim is then removed and carriage 30 is slidable along the length of column 16. The eccentrically mounted cam rollers are then rotated until rollers on opposed sides of the column 16 engage the surface of the column 16. With the configuration described above, it is unnecessary to utilize wear plates since close tolerances without wear producing contact are achieved between the carriage means and the columns without interposing wear plates between the column and carriage.

In the event a drilling mechanism is to be utilized at an angle other than perpendicular to the base 14, a structure such as is shown in FIGS. 6 and 7 may be utilized to alter the angular relationship of column 16 with respect to base 14 of column 118 with respect to carriage 30.

The present invention has been described above with reference to a specific structural arrangement which illustrates a presently preferred embodiment of the invention. The foregoing description has been presented in furtherance of this presently preferred embodiment and is not intended to be an exhaustive catalogue of all forms which structure according to this invention may assume.

I claim
1. A stand for holding and aligning a tool such as a core drill comprising:
   a. base frame means adapted to be secured to a support surface;
   b. a first elongate rectangular beam member projecting from and secured to said base frame means said first beam member having a toothed rack thereon extending the length thereof to receive a first drive pinion; and
   c. a first carriage means slidably mounted on said first beam member said carriage means comprising (1) first and second side plates, said first and second side plates each carrying opposed spaced apart roller means mounted for rotation about an axis perpendicular to said plates, one of said roller means mounted for movement toward and away from another of said roller means whereby said beam member is captured between said opposed spaced apart roller means, (2) means to vary the distance between said first and second side plates and to lock said first and second side plates at a distance apart to receive said column there between (3) a first drive pinion mounted for rotation on an axis perpendicular to the longitudinal axis of said first beam and engaging said rack.
2. The apparatus of claim 1 and
   d. a second elongate rectangular beam member projecting from and secured to said first carriage means, said second beam member having a toothed rack extending along the length thereof to receive a second drive pinion, and
   e. a second carriage means slidably mounted on said second beam member, said second carriage comprising: (1) first and second side plates, said first and second side plates each carrying opposed spaced apart roller means mounted for rotation about an axis perpendicular to said plates, one of said roller means mounted for movement toward and away from another of said roller means whereby said beam member is captured between said opposed spaced apart roller means, (2) means to vary the distance between said first and second side plates and to lock said first and second side plates at a distance apart to receive said column there between (3) a first drive pinion mounted for rotation on an axis perpendicular to the longitudinal axis of said first beam and engaging said rack.
3. The apparatus of claim 1 or 2 wherein said first beam member is pivotally attached to said base frame means.
4. The apparatus of claim 2 wherein said second beam member is pivotally attached to said first carriage means.
5. The apparatus of claim 1 wherein said first beam member is made up of end adjacent beam segments, said segments comprising a hollow rectangular column having a protruding block fastened into a first end thereof and a recessed block fastened into the second end thereof, said protruding block adapted for insertion into said second end of a second, end adjacent segment, said protruding block and said recessed block each having a longitudinal passageway to receive a fastener means to draw said segments together.
6. A portable drill assembly stand for use in concrete drilling and coring comprising;
   a base adapted to be supported on a surface to be drilled;
   a first column segment secured to said base, said first column segment comprising an elongated hollow rectangular conduit having at one end a recessed block means having an axially disposed threaded aperture positioned within said segment and a projecting block having an axially disposed aperture positioned within said segment at the other end thereof so that said column may be secured to said base at said one end by a threaded fastener extending upwardly from said base and connected to a second axially adjacent column segment by another threaded fastener extending through said protruding block into a recessed block of said second column segment, each of said segments having a toothed rack means thereon extending along one face thereof; and a carriage assembly including rotatable pinion means engagable with said rack means for urging said carriage along said column segments, said carriage assembly comprising first and second side plates, each side plate having opposed, spaced apart roller means thereon adapted to engage opposed surfaces of said rectangular column, one of said roller means being movable to vary the distance between said plates to accommodate said column therein; means to lock said first and second side plates in a spaced apart parallel relationship; and mounting means on said carriage to receive a tool or additional column segments oriented perpendicular to said first column segment.

7. The apparatus of claim 6 having additional column segments attached to said carriage and having a second carriage translatable upon said additional column segments to receive a tool.

8. The apparatus of claim 7 wherein said column segments are all interchangeable.

9. The apparatus of claims 1, 2 or 6 wherein said first elongate rectangular beam is rotatable about its longitudinal axis with respect to said base whereby said tool may be located at any desired angular location about said base.

10. The apparatus of claim 6 wherein a single fastener is used to connect each column segment to its axially adjacent column segment.

11. The apparatus of claim 5 wherein said end adjacent beam segments are each connected to adjacent segments by a single axially positioned fastener.

* * * * *